US010874245B2

(12) United States Patent
Lee et al.

(10) Patent No.: US 10,874,245 B2
(45) Date of Patent: Dec. 29, 2020

(54) COOKING APPLIANCE

(71) Applicant: LG ELECTRONICS INC., Seoul (KR)

(72) Inventors: Semi Lee, Seoul (KR); Hoonseob Sim, Seoul (KR); Jaekyung Yang, Seoul (KR); Yongsoo Lee, Seoul (KR); Yoojin Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 97 days.

(21) Appl. No.: 16/292,866

(22) Filed: Mar. 5, 2019

(65) Prior Publication Data
US 2019/0313832 A1    Oct. 17, 2019

(30) Foreign Application Priority Data
Apr. 12, 2018 (KR) .................. 10-2018-0042659

(51) Int. Cl.
*A47J 27/04*     (2006.01)
*F22B 37/14*    (2006.01)

(52) U.S. Cl.
CPC ............. *A47J 27/04* (2013.01); *F22B 37/141* (2013.01); *A47J 2027/043* (2013.01)

(58) Field of Classification Search
CPC ... A47J 27/04; A47J 2027/043; F22B 37/141; F24C 15/003; F24C 15/327
See application file for complete search history.

(56) References Cited

U.S. PATENT DOCUMENTS

| 2,569,757 | A | * | 10/1951 | Gubson | ..................... F22B 5/00 |
| | | | | | 122/20 R |
| 4,320,702 | A | * | 3/1982 | Shein | ...................... A47J 27/04 |
| | | | | | 122/4 A |
| 8,648,281 | B2 | * | 2/2014 | Utsumi | ................. F24C 15/327 |
| | | | | | 219/401 |

(Continued)

FOREIGN PATENT DOCUMENTS

| DE | 102006062069 | 7/2008 |
| EP | 2462808 | 6/2012 |

(Continued)

OTHER PUBLICATIONS

Extended European Search Report in European Application No. 18209696.6, dated Jun. 12, 2019, 9 pages.

(Continued)

*Primary Examiner* — David J Laux
(74) *Attorney, Agent, or Firm* — Fish & Richardson P.C.

(57) ABSTRACT

A cooking appliance includes a main body that defines a cooking chamber configured to receive one or more objects, a steam generator configured to generate steam to heat the one or more objects in the cooking chamber by steam, a water tank configured to store water and to supply water to the steam generator, a water supply pump configured to cause supply of water from the water tank to the steam generator, a first water supply pipe connected to the water tank, a second water supply pipe connected to the steam generator, a connector connected to the first water supply pipe and to the second water supply pipe, and a branch pipe connected to the connector. The water tank is located vertically higher than the steam generator, and the connector and the branch pipe are located vertically higher than the water tank.

20 Claims, 5 Drawing Sheets

(56) References Cited

U.S. PATENT DOCUMENTS

2004/0261632 A1    12/2004  Hansen et al.
2006/0249136 A1*   11/2006  Reay .................. F24C 15/327
                                                             126/20
2016/0061490 A1     3/2016  Cho et al.

FOREIGN PATENT DOCUMENTS

| JP | 2004138346   | 5/2004 |
| JP | 2005195248   | 7/2005 |
| KR | 101480462    | 1/2015 |
| KR | 101582513    | 1/2016 |
| KR | 101593228    | 2/2016 |
| WO | WO2005015088 | 2/2005 |

OTHER PUBLICATIONS

European Office Action in European Appln. No. 18209696.6, dated Jun. 8, 2020, 5 pages.

* cited by examiner

COOKING APPLIANCE

CROSS-REFERENCE TO RELATED APPLICATION

This application is based on and claims the benefit of priority to Korean Patent Application No. 10-2018-0042659, filed on Apr. 12, 2018, in the Korean Intellectual Property Office, the disclosure of which is incorporated herein in its entirety by reference.

FIELD

The present disclosure relates to a cooking appliance.

BACKGROUND

The cooking appliance is an appliance that can cook food using heat of a heating source. The cooking appliance may include a heating source for heating food contained in a cooking chamber.

In some examples, the cooking appliance may include a plurality of heating sources. The plurality of heating sources may include an electric heater, a magnetron, a steam generator, etc.

In some cases, the cooking appliance may include a heating cooker.

For example, the heating cooker may include a main body having a cooking chamber formed therein and a steam generator for supplying steam into the cooking chamber.

A water tank may be provided at an upper side of the cooking chamber to be detached from a front surface of the main body in the form of a drawer, and the steam generator may be disposed at the back side of the cooking chamber to receive water from the water tank through a water supply pipe. A water supply control valve may be provided on the water supply pipe to control flow of water.

If a water supply pump is used as the water supply control valve, the water of the water tank may be supplied to the steam generator when the water supply pump operates, and the water supply pump is stopped when water supply is completed. In some cases, since the water tank is located at the upper side of the steam generator, even when operation of the water supply pump is stopped, negative pressure may be generated, thereby supplying the water of the water tank to the steam generator.

In some cases when the amount of water supplied to the steam generator is large after operation of the water supply pump is stopped, water may overflow from the steam generator.

SUMMARY

The present disclosure provides a cooking appliance capable of preventing water from being additionally supplied to a steam generator by negative pressure in a state in which a water supply pump is stopped after water is supplied to the steam generator.

The present disclosure provides a cooking appliance capable of preventing water discharged from a water tank from being leaked after a water supply pump is stopped.

According to one aspect of the subject matter described in this application, a cooking appliance includes a main body that defines a cooking chamber configured to receive one or more objects, a steam generator configured to generate steam to heat the one or more objects in the cooking chamber by steam, a water tank configured to store water and to supply water to the steam generator, a water supply pump configured to cause supply of water from the water tank to the steam generator, a first water supply pipe connected to the water tank, a second water supply pipe connected to the steam generator, a connector connected to the first water supply pipe and to the second water supply pipe, and a branch pipe connected to the connector. The water tank is located vertically higher than the steam generator, and the connector and the branch pipe are located vertically higher than the water tank.

Implementations according to this aspect may include one or more of the following features. For example, the connector may have a T shape configured to connect to the first water supply pipe, the second water supply pipe, and the branch pipe. In some examples, a portion of the first water supply pipe is located vertically higher than the water tank. In some examples, a portion of the second water supply pipe is located vertically higher than the water tank.

In some implementations, the cooking appliance further includes a check valve connected to the branch pipe and configured to communicate with an atmosphere outside of the branch pipe, where the check valve is configured to, based on communication with the atmosphere outside of the branch pipe, reduce leakage of water from the branch pipe. In some examples, the check valve is located vertically higher than the water tank. In some examples, the steam generator includes a water supply part configured to connect to the second water supply pipe and to receive water from the second water supply pipe, where an entire portion of the second water supply pipe is located vertically higher than the water supply part.

In some implementations, the steam generator includes a water supply part configured to connect to the second water supply pipe and to receive water from the second water supply pipe, and the second water supply pipe includes a first portion located vertically lower than the water supply part and a second portion located vertically higher than the water supply part. In some examples, a length of the branch pipe is greater than a length of the first portion of the second water supply pipe. In some implementations, the water tank is located at an upper side of the cooking chamber, and the steam generator is located at a rear side of the cooking chamber.

In some implementations, the cooking appliance further includes a drain pipe configured to connect the steam generator to the water tank, and a drainage pump located at the drain pipe and configured to cause discharge of water from the steam generator to the water tank. In some examples, the drainage pump is located vertically between the steam generator and the water tank.

In some implementations, the water supply pump is located vertically between the steam generator and the water tank. In some examples, the connector has a first end connected to the first water supply pipe, a second end connected to the second water supply pipe, and a third end connected to the branch pipe, where the first end is located vertically higher than the second end, and the third end is located vertically higher than the first end. In some examples, the first end of the connector and the third end of the connector are collinear.

In some implementations, the cooking appliance further includes a check valve connected to the branch pipe and configured to communicate with an atmosphere outside of the branch pipe. The third end of the connector may be connected to a first end of the branch pipe that is vertically higher than the water tank, and the check valve may be connected to a second end of the branch pipe that is vertically higher than the first end of the branch pipe.

In some implementations, the cooking appliance further includes a steam supply pipe connected to the steam generator and configured to supply steam from the steam generator to the cooking chamber, where the steam generator includes a first port configured to connect to the steam supply pipe, and a second port configured to connect to the second water supply pipe, the second port being located vertically lower than the first port.

In some implementations, the main body further defines a steam supply port exposed to the cooking chamber and configured to discharge steam to the cooking chamber, where the steam supply port is located vertically higher than the steam generator and vertically lower than the water tank. In some examples, the cooking appliance further includes a door coupled to the main body and configured to open and close at least a portion of the cooking chamber, where the steam supply port is located at a rear wall of the cooking chamber that faces the door.

In some examples, the length of the first portion of the second water supply pipe is less than a length of the second portion of the second water supply pipe. In some examples, a length of the first water supply pipe is less than a length of the second water supply pipe.

DETAILED DESCRIPTION

Figure 1:
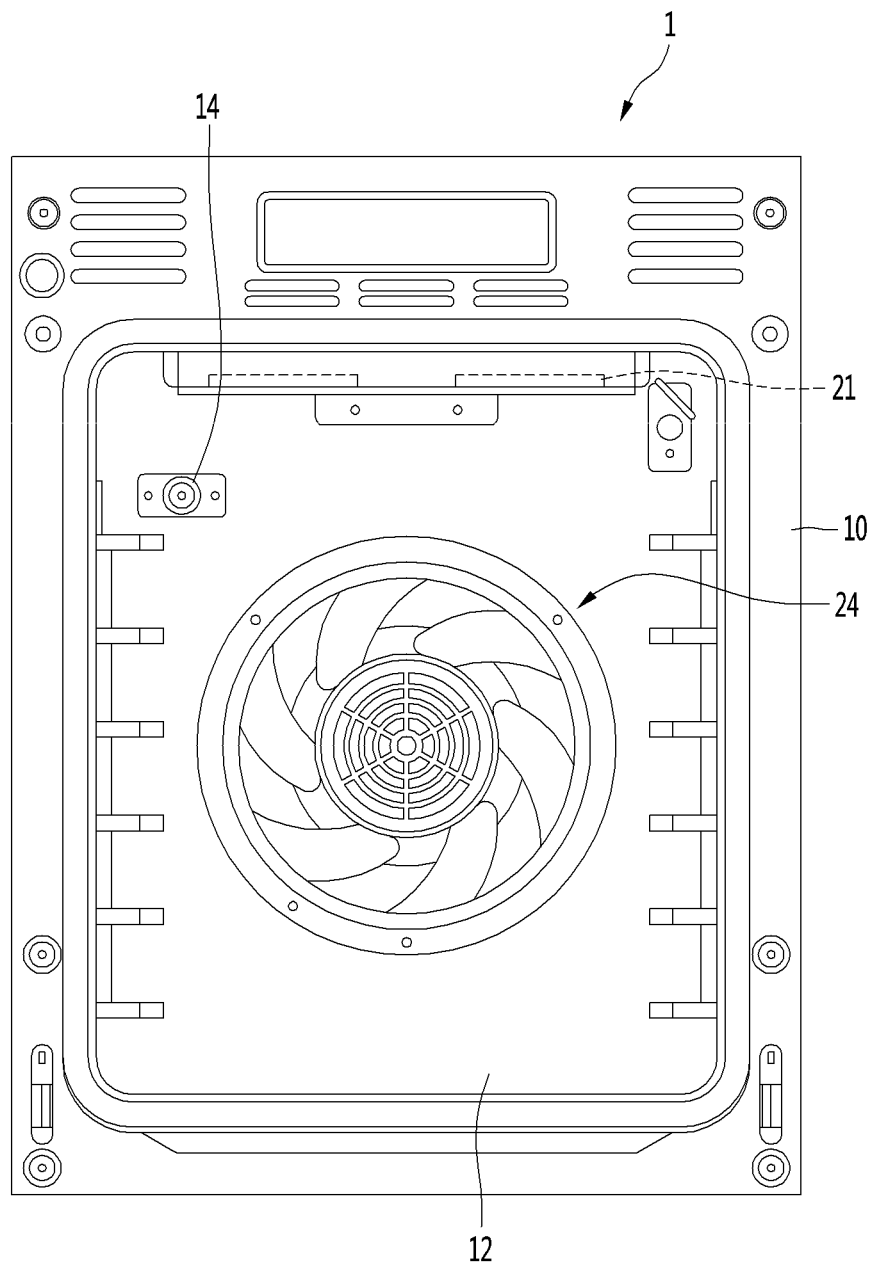
FIG. 1 is a view schematically showing an inside of an example cooking chamber of a cooking appliance.

Hereinafter, some implementations of the present disclosure will be described in detail with reference to the accompanying drawings. It should be noted that when components in the drawings are designated by reference numerals, the same components have the same reference numerals as far as possible even though the components are illustrated in different drawings. Further, in description of implementations of the present disclosure, when it is determined that detailed descriptions of well-known configurations or functions disturb understanding of the implementations of the present disclosure, the detailed descriptions will be omitted.

Also, in the description of the implementations of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
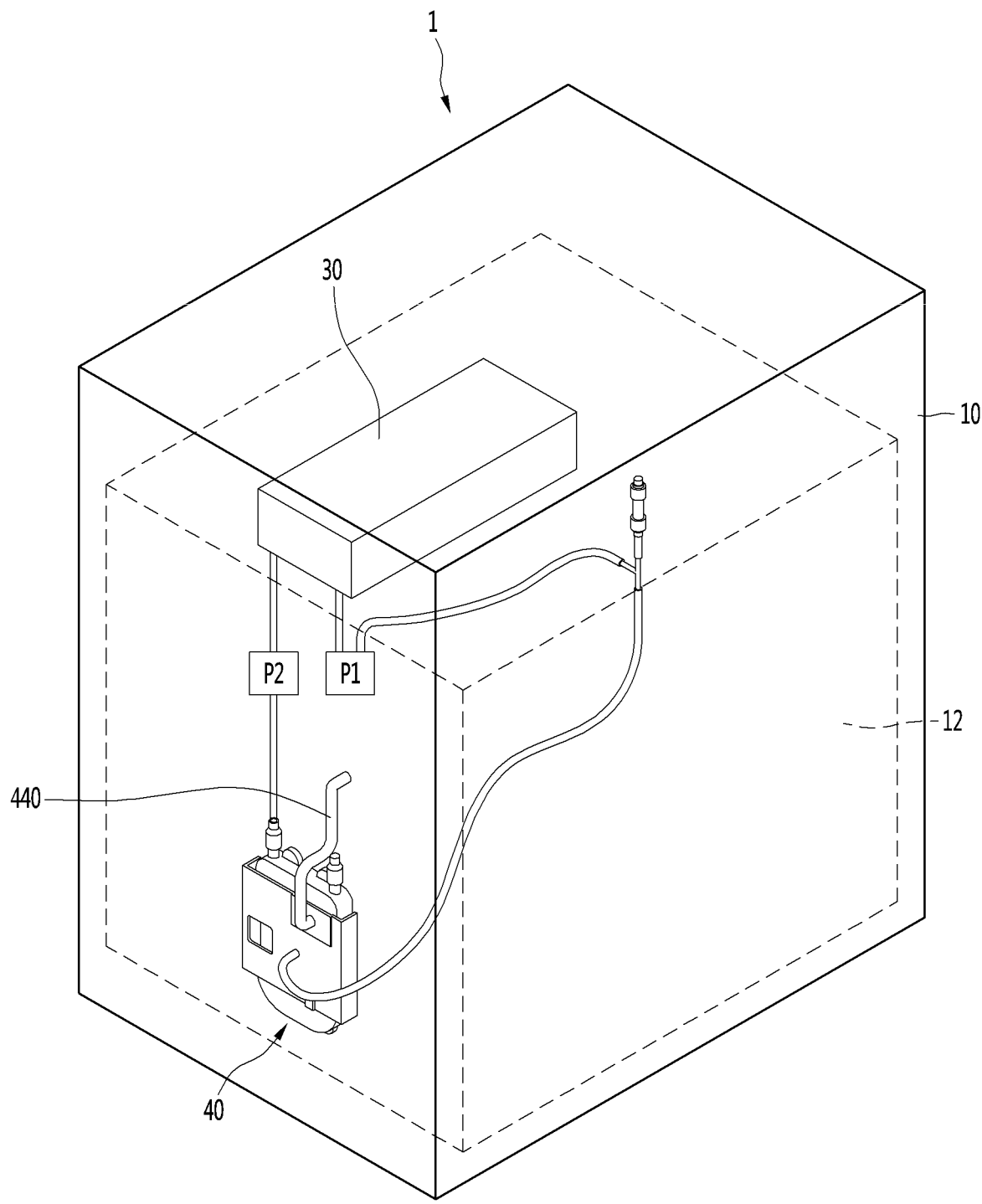
FIG. 2 is a view showing a state in which an example steam generator and an example water tank are installed in an example cooking appliance.
Figure 3:
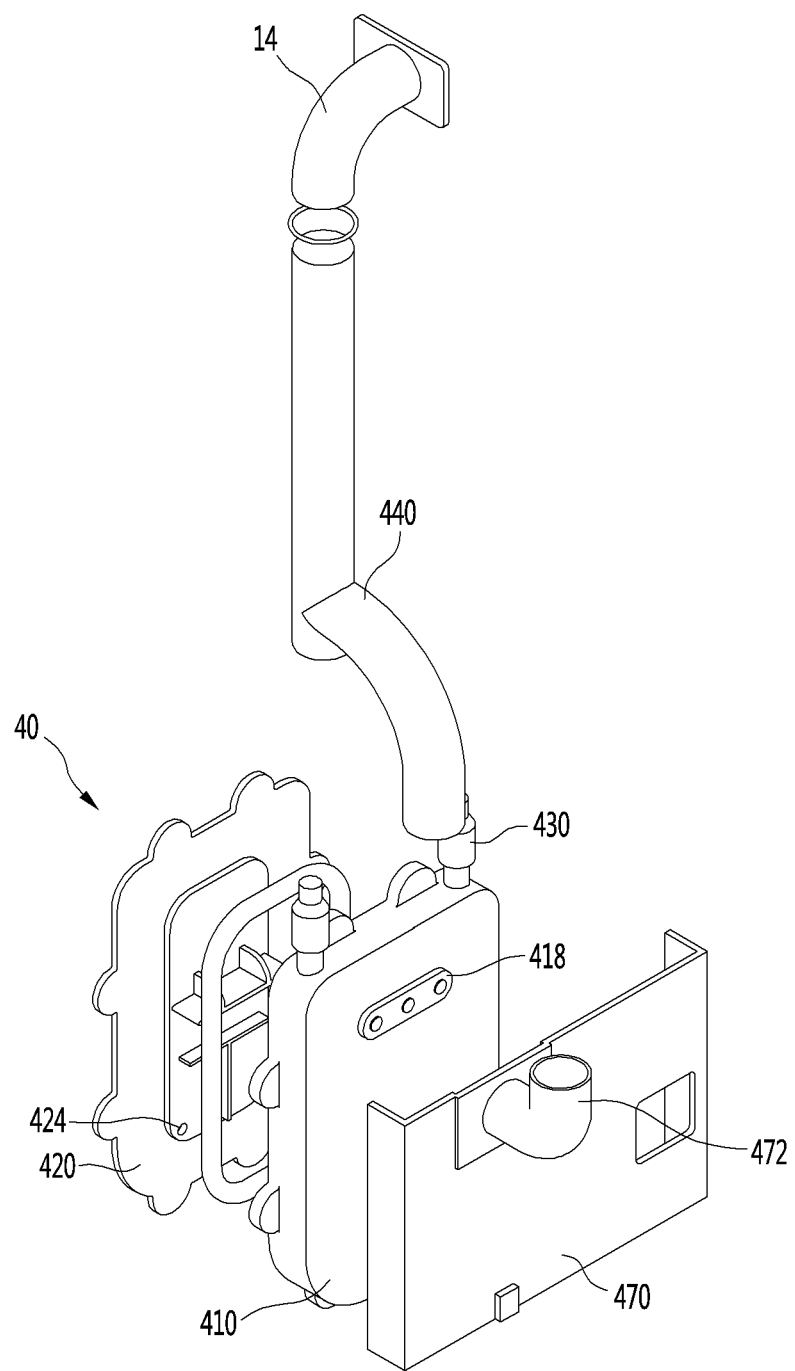
FIG. 3 is an exploded perspective view of an example steam generator.
Figure 4:
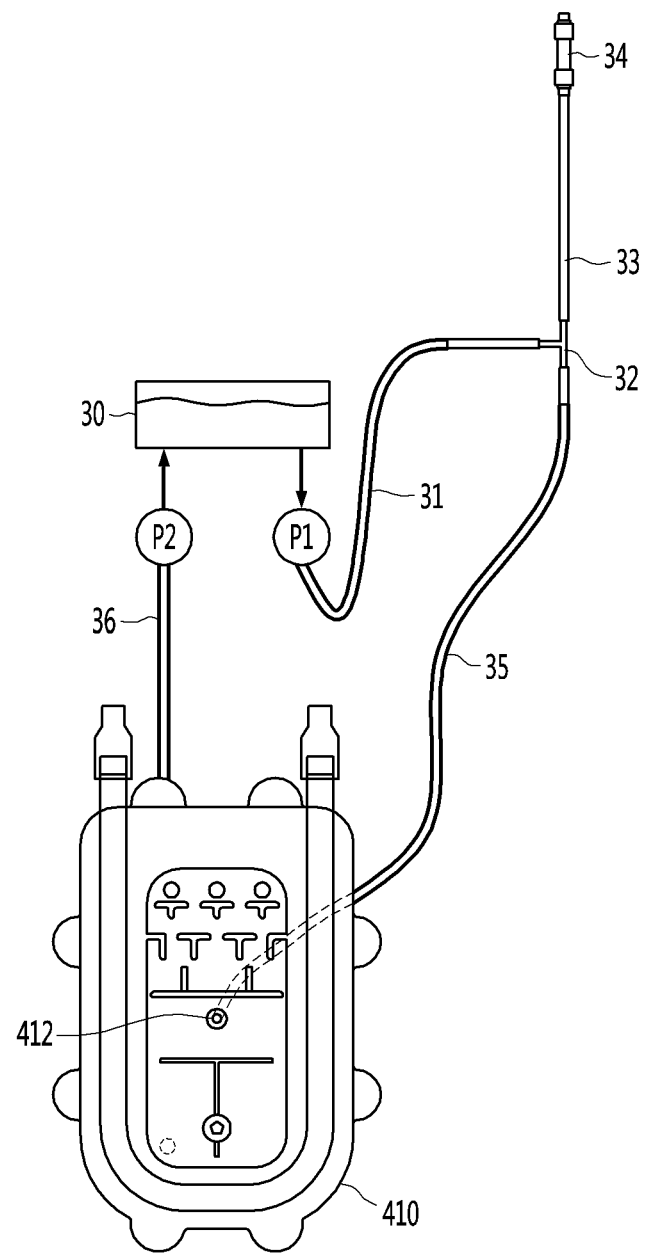
FIG. 4 is a view showing an example arrangement of an example water tank, an example steam generator, an example connector, and an example check valve.

FIG. 1 is a view schematically showing an inside of an example cooking chamber of an example cooking appliance, FIG. 2 is a view showing a state in which an example steam generator and an example water tank are installed in an example cooking appliance, FIG. 3 is an exploded perspective view of an example steam generator, and FIG. 4 is a view showing an example arrangement of an example water tank, an example steam generator, an example connector, and an example check valve.

Referring to FIGS. 1 to 4, the cooking appliance 1 may include a main body 10. The main body 10 may include a cooking chamber 12. In some implementations, the cooking appliance 1 may further include a door connected to the main body 10 to open or close the cooking chamber 12.

The cooking appliance 1 may include a plurality of heating sources in order to cook the food contained in the cooking chamber 12.

The plurality of heating sources may include different types of heating sources.

In some examples, although not limited, the plurality of heating sources may include, for example, a heater 21.

The heater 21 may be located above the cooking chamber 12 and may supply heat to the upper side of the cooking chamber 12. In some examples, the upper heater 21 may be located above the cooking chamber 12 at the outside of the cooking chamber 12. In this case, an opening, through which heat passes, may be formed in the upper wall of the cooking chamber 12. Alternatively, when the upper heater generates radiant energy, a transmission part may be provided in the upper wall of the cooking chamber 12.

In some implementations, an additional heater may be further provided at the lower side of the cooking chamber 12.

In some implementations, the plurality of heating sources may further include a convection heater configuring a convection device 24. The convection device 24 may include a convection fan. By the convection fan, air in the cooking chamber 12 may flow to the convection heater, thereby being heated and then supplied to the cooking chamber 12.

The plurality of heating sources may further include a steam generator 40 for heating water to generate steam.

The cooking appliance 1 may further include a water tank 30 for supplying water to the steam generator 40. Although not limited, the water tank 30 may be disposed at a position higher than the steam generator 40 in the main body 10.

For example, the water tank 30 may be located above the cooking chamber 12. The water tank 30 may be installed on the rear wall of the cooking chamber 12.

The cooking appliance 1 further includes water supply pipes 31 and 35 for supplying the water of the water tank 30 to the steam generator 40, a water supply pump P1 connected to the water supply pipe 31, a drain pipe 36 for discharging the water of the steam generator 40, and a drainage pump P2 connected to the drain pipe 36.

In some implementations, although not limited, the drain pipe 36 may be connected to the water tank 30. Accordingly, the water of the water tank 30 may be supplied to the steam generator 40, and the water of the steam generator 40 may be drained and returned to the water tank 30.

The steam generator 40 may include a first body 410 and a second body 420 coupled to the first body 410.

In a state in which the first body 410 and the second body 420 are coupled, the first body 410 and the second body 420 may form a heating chamber 411.

A steam heater 430 may be embedded in any one of the first body 410 or the second body 420.

In FIG. 3, for example, the steam heater 430 is installed in the first body 410.

Water supplied from the water tank 30 may be heated by heat generated by the steam heater 430 in the heating chamber 411.

A water supply part 412 for supplying water to the heating chamber 411 may be provided in any one of the first body 410 or the second body 420. The water supply part 412 may communicate with the water supply pipes 31 and 35.

In the present implementation, the water supply part 412 may be provided in the first body 410, for example.

A steam discharge part 418 for discharging steam generated by the heating chamber 411 may be provided in any one of the first body 410 or the second body 420.

In FIG. 3, the steam discharge part 418 is provided in the first body 410, for example.

A drain part 424 for discharging water of the heating chamber 411 may be provided in any one of the first body 410 or the second body 420.

In FIG. 3, for example, the drain part 424 is provided in the second body 420. The drain pipe 36 may be connected to the drain part 424.

The water supply part 412 may be located at a position higher than the drain part 424 and located at a position lower than the steam discharge part 418.

The steam generator 40 may further include a mounting bracket 470 for mounting the steam generator 40 in the main body 10. The mounting bracket 470 may be, for example, coupled to the first body 410.

The mounting bracket 470 may include a steam guide pipe 472 for guiding the steam discharged from the steam discharge part 418.

The cooking appliance 1 may further include a steam supply pipe 440 connected to the steam guide pipe 472 to supply the steam generated by the steam generator 40 to the cooking chamber 12.

The steam supply pipe 440 may be connected to a steam supply port 14. The steam supply port 14 is, for example, coupled to the main body 10 to finally supply steam to the cooking chamber 12.

Accordingly, at least a portion of the steam supply port 14 may be exposed to the cooking chamber 12.

As another example, the steam supply pipe 440 may be directly connected to the main body 10 and the end of the steam supply pipe 440 may include the steam supply port 14.

The steam supply pipe 440 is bent once or more to guide the stream discharged from the steam discharge part 418 upward and to supply the steam to the cooking chamber 12.

In some implementations, the water supply pipes 31 and 35 may include the first water supply pipe 31 connected to the water tank 30 and the second water supply pipe 35 connected to the steam generator 40.

Although not limited, in a state in which the second water supply pipe 35 is connected to the water supply part 412, the whole of the second water supply pipe 35 is located at a position higher than the water supply part 412.

The water supply pump P1 may be, for example, provided on the first water supply pipe 31. A connector 32 may be connected to the first water supply pipe 31. The connector 32 may be a T-shaped connector, for example.

Accordingly, the first water supply pipe 31 and the second water supply pipe 35 may be connected to the connector 32.

In addition, a branch pipe 33 may be connected to the connector 32. In addition, a check valve 34 is connected to an end of the branch pipe 33. The check valve 34 may communicate with outside air (air located outside the cooking chamber 12, because the check valve 34 is located inside the cooking appliance 1) such that the pressure of the branch pipe 33 is maintained at atmospheric pressure.

The check valve 34 prevents water flowing to the branch pipe 33 from being discharged to the outside. For example, the check valve 34 may include a housing having an opening communicating with the outside, a moving body moved in the housing, and an elastic member supporting the moving body.

The moving body may be maintained in a state of being separated from the opening by the elastic force of the elastic member. In contrast, when water flows to the branch pipe, water pressurizes the moving body such that the moving body blocks the opening. Accordingly, even when water is moved to the branch pipe 33, it is possible to prevent water from being leaked by the check valve 34.

Before the water supply pump P1 operates or when the water supply pump P1 operates, the connector 32, the branch pipe 33 and the check valve 34 may be located at a position higher than the water tank 30 from the bottom to prevent water from flowing to the branch pipe 33.

In addition, a portion of the first water supply pipe 31 may be located at a position higher than the water tank 30. In addition, a portion of the second water supply pipe 35 may be located at a position higher than the water tank 30.

Accordingly, since the pressure of the branch pipe 33 is atmospheric pressure and the pressures of the water supply pipes 31 and 35 become less than the atmospheric pressure at the time of operating the water supply pump P1, water does not flow to the branch pipe 33.

At the time of operating the water supply pump P1, the water of the water tank 30 may be smoothly supplied to the steam generator 40 through the first water supply pipe 31 and the second water supply pipe 35.

In some implementations, since the water tank 30 is located at a position higher than the steam generator 40, even after operation of the water supply pump P1 is completed, negative pressure is generated in the water tank 30 and thus some of the water of the water tank 30 may be discharged to the first water supply pipe 31.

In the present implementation, since the pressure of the branch pipe 33 is atmospheric pressure, the water discharged to the first water supply pipe 31 flows to the branch pipe 33 and remains in the branch pipe 33. As described above, the water flowing to the branch pipe 33 is prevented from being discharged by the check valve 34.

According to the present implementation, even when water is discharged from the water tank 30 by the negative pressure of the water tank 30 after operation of the water supply pump P1 is completed, since the water discharged from the water tank 30 flows to the branch pipe 33, water is prevented from being supplied to the steam generator 40.

When the water discharged from the water tank 30 is not supplied to the steam generator 40, it is possible to prevent a phenomenon that water overflows from the steam generator 40 and flows into the cooking chamber 12.

Figure 5:
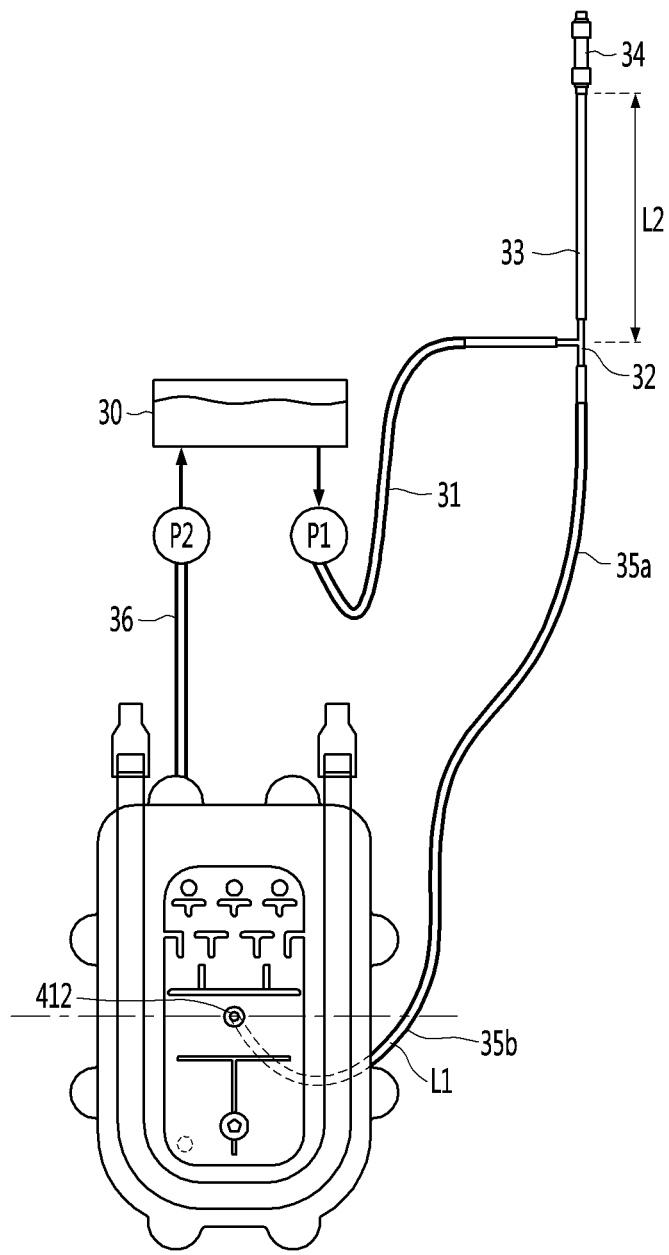
FIG. 5 is a view showing another example arrangement of an example water tank, an example steam generator, an example connector, and an example check valve.

FIG. 5 is a view showing another example arrangement of an example water tank, an example steam generator, an example connector, and an example check valve.

The present implementation is equal to the previous implementation except for arrangement in the second water supply pipe connected to the steam generator. Therefore, hereinafter, the characteristics of the present implementation will be described.

Referring to FIG. 5, a first water supply pipe 31, a second water supply pipe 35a and a branch pipe 33 are connected to a connector 32.

The second water supply pipe 35a is connected to a water supply part 412 of a steam generator 40. At this time, in a state in which the second water supply pipe 35a is connected to the water supply part 412, a portion of the second water supply pipe 35a may be located at a position lower than the water supply part 412.

In the present implementation, the length L2 of the branch pipe 33 is greater than that of a portion 35b, which is located at a position lower than the water supply part 412, of the second water supply pipe 35a.

In a state in which operation of the water supply pump P1 is stopped, the second water supply pipe 35a is filled with water.

If the steam generator 40 is filled with water in a state in which operation of the water supply pump P1 is stopped, since the water pressure of the steam generator 40 is higher than that of the second water supply pipe 35a located at the position lower than the water supply part 412, the water of the steam generator 40 may be discharged to at least the portion 35b of the second water supply pipe 35a.

Even if the water of the steam generator 40 is discharged to the second water supply pipe 35a, the water of the second water supply pipe 35a may flow to the branch pipe 33. If the length L2 of the branch pipe 33 is greater than the length L1 of the portion 35b of the second water supply pipe 35a, even when the water of the portion 35b of the second water supply pipe 35a flows to the branch pipe 33, the branch pipe 33 may communicate with outside air and thus the pressure of the branch pipe becomes atmospheric pressure.

In this case, when the water supply pump P1 operates later, the water of the branch pipe 33 flows to the second water supply pipe 35a again.

What is claimed is:

1. A cooking appliance comprising:
 a main body that defines a cooking chamber configured to receive one or more objects;
 a steam generator configured to generate steam to heat the one or more objects in the cooking chamber by steam;
 a water tank configured to store water and to supply water to the steam generator;
 a water supply pump configured to cause supply of water from the water tank to the steam generator;
 a first water supply pipe connected to the water tank;
 a second water supply pipe connected to the steam generator;
 a connector connected to the first water supply pipe and to the second water supply pipe; and
 a branch pipe connected to the connector,
 wherein the water tank is located vertically higher than the steam generator, and
 wherein the connector and the branch pipe are located vertically higher than the water tank.

2. The cooking appliance of claim 1, wherein the connector has a T shape configured to connect to the first water supply pipe, the second water supply pipe, and the branch pipe.

3. The cooking appliance of claim 1, wherein a portion of the first water supply pipe is located vertically higher than the water tank.

4. The cooking appliance of claim 1, wherein a portion of the second water supply pipe is located vertically higher than the water tank.

5. The cooking appliance of claim 1, further comprising a check valve connected to the branch pipe and configured to communicate with an atmosphere outside of the branch pipe,
 wherein the check valve is configured to, based on communication with the atmosphere outside of the branch pipe, reduce leakage of water from the branch pipe.

6. The cooking appliance of claim 5, wherein the check valve is located vertically higher than the water tank.

7. The cooking appliance of claim 1, wherein the steam generator comprises a water supply part configured to connect to the second water supply pipe and to receive water from the second water supply pipe, and
 wherein an entire portion of the second water supply pipe is located vertically higher than the water supply part.

8. The cooking appliance of claim 1, wherein the steam generator comprises a water supply part configured to connect to the second water supply pipe and to receive water from the second water supply pipe,
 wherein the second water supply pipe comprises a first portion located vertically lower than the water supply part and a second portion located vertically higher than the water supply part, and
 wherein a length of the branch pipe is greater than a length of the first portion of the second water supply pipe.

9. The cooking appliance of claim 8, wherein the length of the first portion of the second water supply pipe is less than a length of the second portion of the second water supply pipe.

10. The cooking appliance of claim 1, wherein the water tank is located at an upper side of the cooking chamber, and
 wherein the steam generator is located at a rear side of the cooking chamber.

11. The cooking appliance of claim 1, further comprising:
 a drain pipe configured to connect the steam generator to the water tank; and
 a drainage pump located at the drain pipe and configured to cause discharge of water from the steam generator to the water tank.

12. The cooking appliance of claim 11, wherein the drainage pump is located vertically between the steam generator and the water tank.

13. The cooking appliance of claim 1, wherein the water supply pump is located vertically between the steam generator and the water tank.

14. The cooking appliance of claim 1, wherein the connector has a first end connected to the first water supply pipe, a second end connected to the second water supply pipe, and a third end connected to the branch pipe, and
 wherein the first end is located vertically higher than the second end, and the third end is located vertically higher than the first end.

15. The cooking appliance of claim 14, wherein the first end of the connector and the third end of the connector are collinear.

16. The cooking appliance of claim 14, further comprising a check valve connected to the branch pipe and configured to communicate with an atmosphere outside of the branch pipe,
 wherein the third end of the connector is connected to a first end of the branch pipe that is vertically higher than the water tank, and
 wherein the check valve is connected to a second end of the branch pipe that is vertically higher than the first end of the branch pipe.

17. The cooking appliance of claim 1, further comprising a steam supply pipe connected to the steam generator and configured to supply steam from the steam generator to the cooking chamber,
 wherein the steam generator comprises a first port configured to connect to the steam supply pipe, and a second port configured to connect to the second water supply pipe, the second port being located vertically lower than the first port.

18. The cooking appliance of claim 1, wherein the main body further defines a steam supply port exposed to the cooking chamber and configured to discharge steam to the cooking chamber, and wherein the steam supply port is located vertically higher than the steam generator and vertically lower than the water tank.

19. The cooking appliance of claim 18, further comprising a door coupled to the main body and configured to open and close at least a portion of the cooking chamber, wherein the steam supply port is located at a rear wall of the cooking chamber that faces the door.

20. The cooking appliance of claim 1, wherein a length of the first water supply pipe is less than a length of the second water supply pipe.

\* \* \* \* \*